United States Patent
Cao et al.

(10) Patent No.: US 10,125,852 B2
(45) Date of Patent: Nov. 13, 2018

(54) LINEAR DRIVING DEVICE, CONNECTOR AND EXHAUST GAS RECIRCULATION CONTROL VALVE

(71) Applicant: CONTINENTAL AUTOMOTIVE GMBH, Hannover (DE)

(72) Inventors: Xiangguang Cao, Wuhu (CN); Longsheng Zhao, Wuhu (CN); Xiaolin Du, Wuhu (CN); Jingjing Song, Wuhu (CN)

(73) Assignee: Continental Automotive GmbH, Hannover (DE)

( * ) Notice: Subject to any disclaimer, the term of this patent is extended or adjusted under 35 U.S.C. 154(b) by 67 days.

(21) Appl. No.: 14/916,371

(22) PCT Filed: Sep. 5, 2014

(86) PCT No.: PCT/EP2014/068975
§ 371 (c)(1),
(2) Date: Mar. 3, 2016

(87) PCT Pub. No.: WO2015/036333
PCT Pub. Date: Mar. 19, 2015

(65) Prior Publication Data
US 2016/0201781 A1    Jul. 14, 2016

(30) Foreign Application Priority Data

Sep. 10, 2013   (CN) .................... 2013 2 0560905 U

(51) Int. Cl.
*F16H 37/00*   (2006.01)
*F16H 37/12*   (2006.01)
(Continued)

(52) U.S. Cl.
CPC .......... *F16H 37/124* (2013.01); *F02M 26/52* (2016.02); *F02M 26/54* (2016.02); *F02M 26/66* (2016.02);
(Continued)

(58) Field of Classification Search
CPC ...... F16H 37/124; F16H 25/18; F16H 19/001; F02M 26/52; F02M 26/54; F02M 26/66
(Continued)

(56) References Cited

U.S. PATENT DOCUMENTS 2,991,872 A * 7/1961 Keegan .................... B06B 1/10
74/55
5,598,636 A * 2/1997 Stolzer ................. B23D 49/165
74/55
(Continued)

FOREIGN PATENT DOCUMENTS

CN   201 747 485 U   2/2011
CN   202 561 210 U   11/2012
(Continued)

OTHER PUBLICATIONS

Office Action dated Mar. 6, 2017 which issued in the corresponding Japanese Patent Application No. 2016-541895.

*Primary Examiner* — William C Joyce
(74) *Attorney, Agent, or Firm* — Cozen O'Connor

(57) ABSTRACT

A linear drive device includes: a motor; a speed-reducing transmission stage having: a pinion gear fixedly connected to an output shaft of the motor, and a transmission gear meshing with the pinion gear; a linear transmission stage configured to transform a rotational movement of the transmission gear into a linear movement of an output connecting rod, the output connecting rod being received in a sleeve member so as to only move linearly; a spiral trench arranged on the transmission gear; and a follower received in the
(Continued)

spiral trench so as to be movable in the spiral trench. The follower is connected to the output connecting rod via a connector, and the connector is configured as a right-angle member.

9 Claims, 11 Drawing Sheets

(51) Int. Cl.
    *F02M 26/52*    (2016.01)
    *F16H 19/00*    (2006.01)
    *F16K 31/53*    (2006.01)
    *F16K 31/528*    (2006.01)
    *F16H 25/18*    (2006.01)
    *F02M 26/54*    (2016.01)
    *F02M 26/66*    (2016.01)

(52) U.S. Cl.
    CPC ........... *F16H 19/001* (2013.01); *F16H 25/18* (2013.01); *F16K 31/528* (2013.01); *F16K 31/53* (2013.01)

(58) Field of Classification Search
    USPC .............................................................. 74/55
    See application file for complete search history.

(56) References Cited

U.S. PATENT DOCUMENTS

| 6,062,826 | A | * | 5/2000 | Morimoto | F16K 31/52408 |
| | | | | | 74/55 |
| 8,181,545 | B2 | * | 5/2012 | Keefover | F16K 31/047 |
| | | | | | 74/55 |
| 2002/0104938 | A1 | * | 8/2002 | Simard | A47B 57/34 |
| | | | | | 248/218.4 |

FOREIGN PATENT DOCUMENTS

| CN | 202561210 U | 11/2012 |
| EP | 1882843 A2 | 1/2008 |
| WO | WO 2013/167704 | 11/2013 |
| WO | WO 2013/167704 A1 | 11/2013 |

\* cited by examiner

TITLE: LINEAR DRIVING DEVICE, CONNECTOR AND EXHAUST GAS RECIRCULATION CONTROL VALVE

CROSS-REFERENCE TO RELATED APPLICATIONS

This is a U.S. national stage of application No. PCT/EP2014/068975, filed on 5 Sep. 2014, which claims priority to the Chinese Application No. 2013 205 60905.5 filed 10 Sep. 2013, the content of both incorporated herein by reference.

BACKGROUND OF THE INVENTION

1. Field of the Invention

The present invention relates to a linear drive device, a connector for a linear drive device and an exhaust gas recirculation control valve with a linear drive device.

2. Related Art

In industries such as the automotive industry, a valve device able to be precisely controlled is generally required, for example, an exhaust gas recirculation control valve for use in an engine exhaust gas recirculation system. In such a valve device, a linear drive device able to be precisely controlled is required, and it is desirable that this valve device can be as light as possible and miniaturized.

A connector for a rotational movement part and a linear movement part generally has a complex structure and high machining costs, and can hardly avoid the influence of shaking or swinging on a sensor.

SUMMARY OF THE INVENTION

In accordance with a first aspect of the present invention, a linear drive device is proposed, in which a connector for connecting a rotational movement part and a linear movement part allows easy assembling, the capability of guiding, and avoids the influence of a substantial rotation on a sensor signal.

According to one aspect, the linear drive device includes: a motor; a speed-reducing transmission stage comprising a pinion gear fixedly connected to an output shaft of the motor and a transmission gear meshing with the pinion gear; and a linear transmission stage for transforming a rotational movement of the transmission gear into a linear movement of a output connecting rod, the output connecting rod being received in a sleeve member so as to merely move linearly. A spiral trench is provided on the transmission gear, a follower capable of moving in the trench is received in the trench, the follower is connected to the output connecting rod via a connector, and the connector is configured as a right-angle member.

In a preferred embodiment, the follower comprises a bearing and a pin shaft inserted into an inner ring of the bearing.

In a preferred embodiment, a first hole for connecting the pin shaft of the follower is provided in a vertical face of the connector.

In a preferred embodiment, a second hole for connecting a connecting rod journal of the output connecting rod is provided in a horizontal face of the connector.

In a preferred embodiment, a third hole for connecting a sensor pointer of a position sensor is further provided in the vertical face of the connector.

In a preferred embodiment, center axes of the first hole, the second hole and the third hole are all located in a center plane of the connector.

In a preferred embodiment, an arcuate wing portion is provided in the vertical face of the connector.

In a preferred embodiment, two inwardly concave reinforcement ribs are provided at the right-angle corner where the vertical face and the horizontal face of the connector meet each other.

In a preferred embodiment, the reinforcement ribs are formed by stamping, and/or the reinforcement ribs intersect the vertical face at an angle of 30 degrees to 60 degrees.

An aspect of the present invention further relates to a connector configured as a right-angle member, wherein a first hole is provided in a vertical face of the connector, a second hole is provided in a horizontal face of the connector, a third hole is further provided in the vertical face of the connector, center axes of the first hole, the second hole and the third hole are all located in a center plane of the connector, and an arcuate wing portion is provided in the vertical face of the connector.

Another aspect of the present invention furthermore relates to an exhaust gas recirculation control valve for use in an exhaust gas recirculation circuit of an engine, the exhaust gas recirculation control valve comprising a linear drive device according to the present invention.

DETAILED DESCRIPTION OF THE PRESENTLY PREFERRED EMBODIMENTS

The linear drive device, the connector and the corresponding exhaust gas recirculation control valve according to embodiments of the present invention will be described with reference to the drawings. In the following description, many specific details are set forth in order to enable a person skilled in the art to more completely understand the present invention. However, it will be apparent to a person skilled in the field that the present invention may be achieved without some of these specific details. Furthermore, it should be understood that the present invention is not limited to the particular embodiments described herein. Instead, it is envisaged herein that any combination of the following features and elements can be used to implement the present invention, regardless of whether or not they are involved in different embodiments. Therefore, the following aspects, features, embodiments and advantages are merely illustrative and should not be regarded as elements or definitions of the claims, unless explicitly stated in the claims.

Taking a linear drive device of an exhaust gas recirculation control valve for use in the engine exhaust gas recirculation as an example, the linear drive device according to an embodiment of the present invention will be explained below, but the present invention is not limited thereto. The linear drive device according to the present invention can be used with any equipment requiring small precise linear control, such as a variety of valves and actuators.

Figure 1:
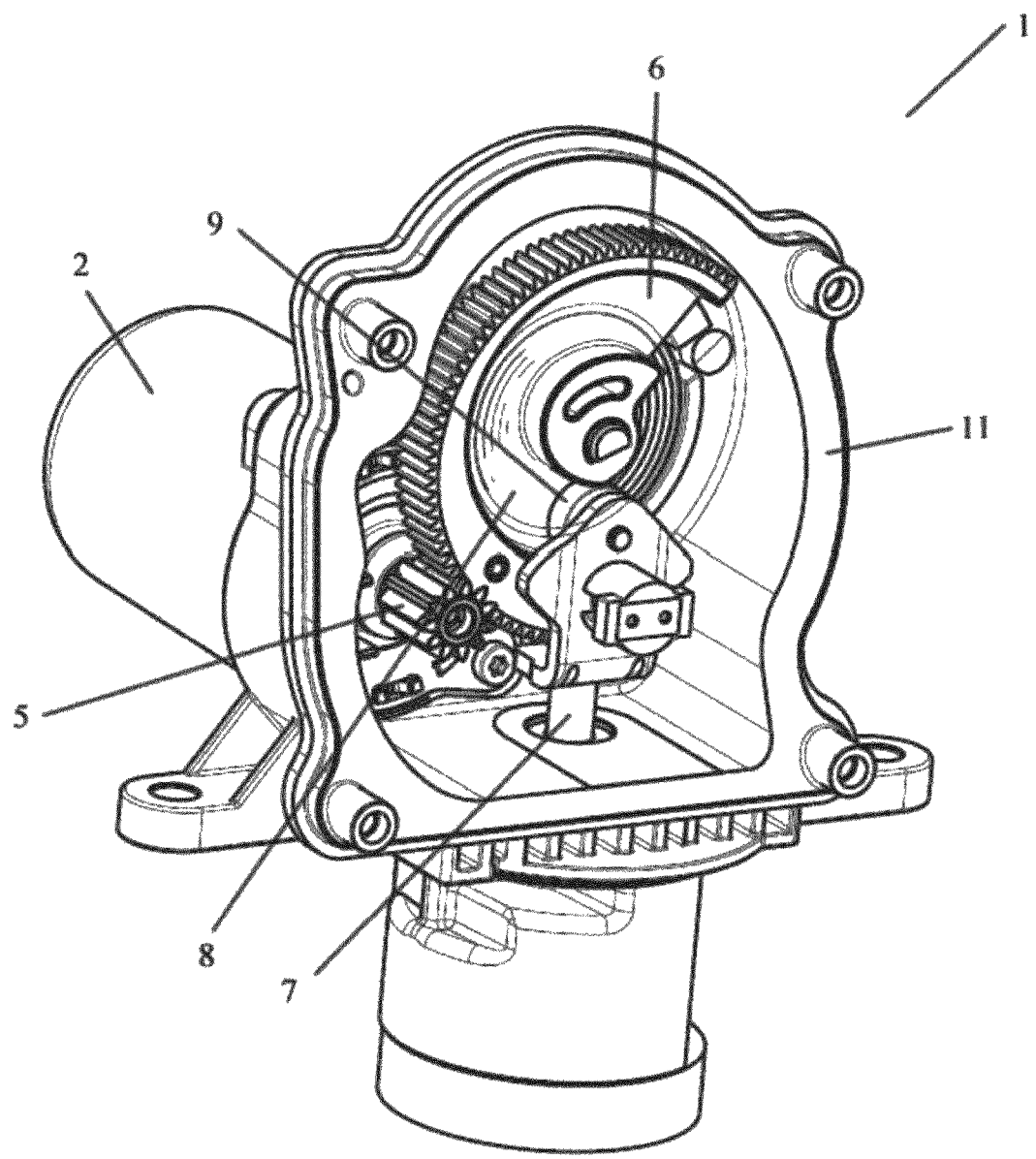
FIG. 1 shows a perspective view of a preferred embodiment of a linear drive device according to an embodiment the present invention.
Figure 2:
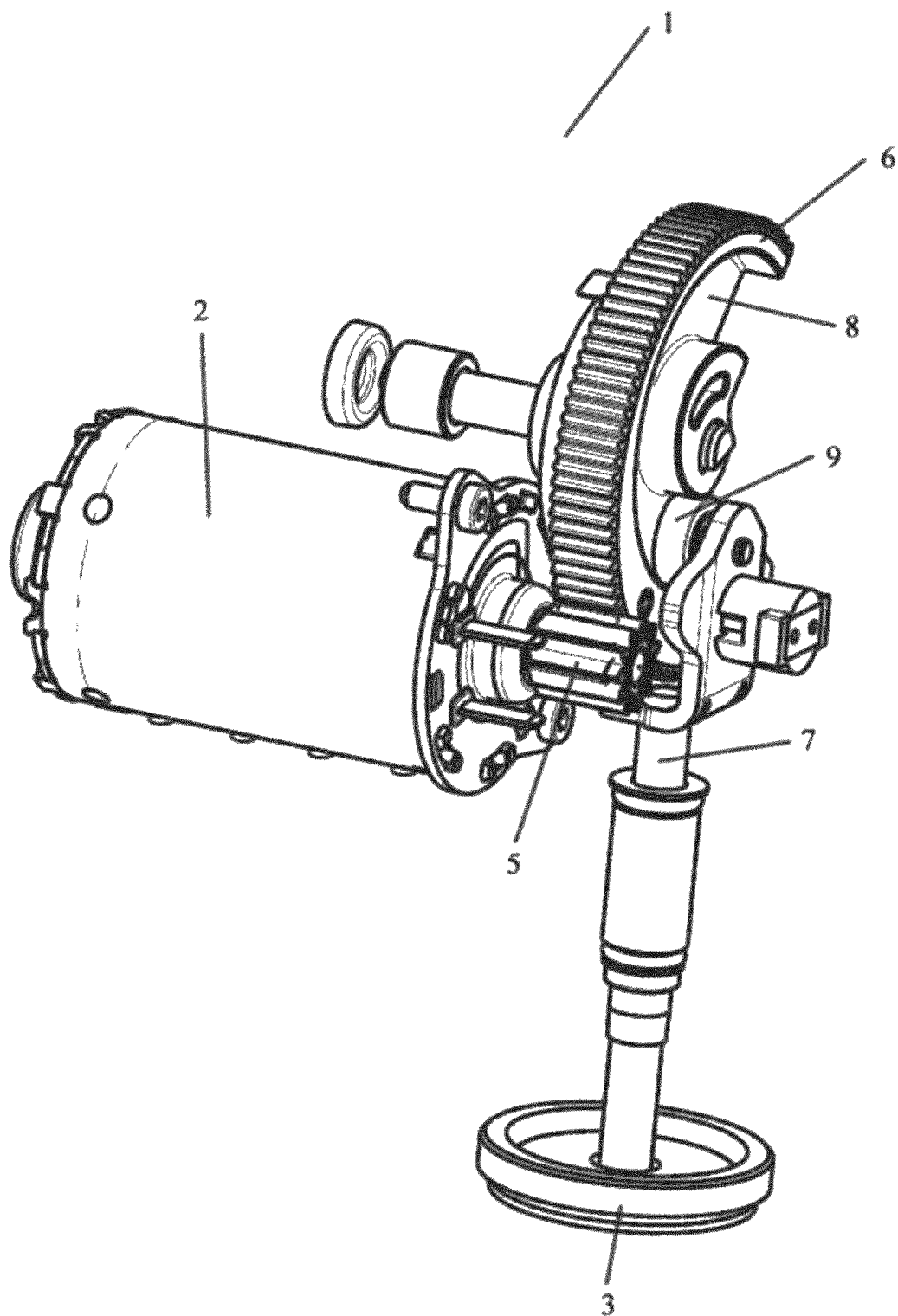
FIG. 2 shows another perspective view of the preferred embodiment of the linear drive device according to the present invention, without showing an external housing.
Figure 3:
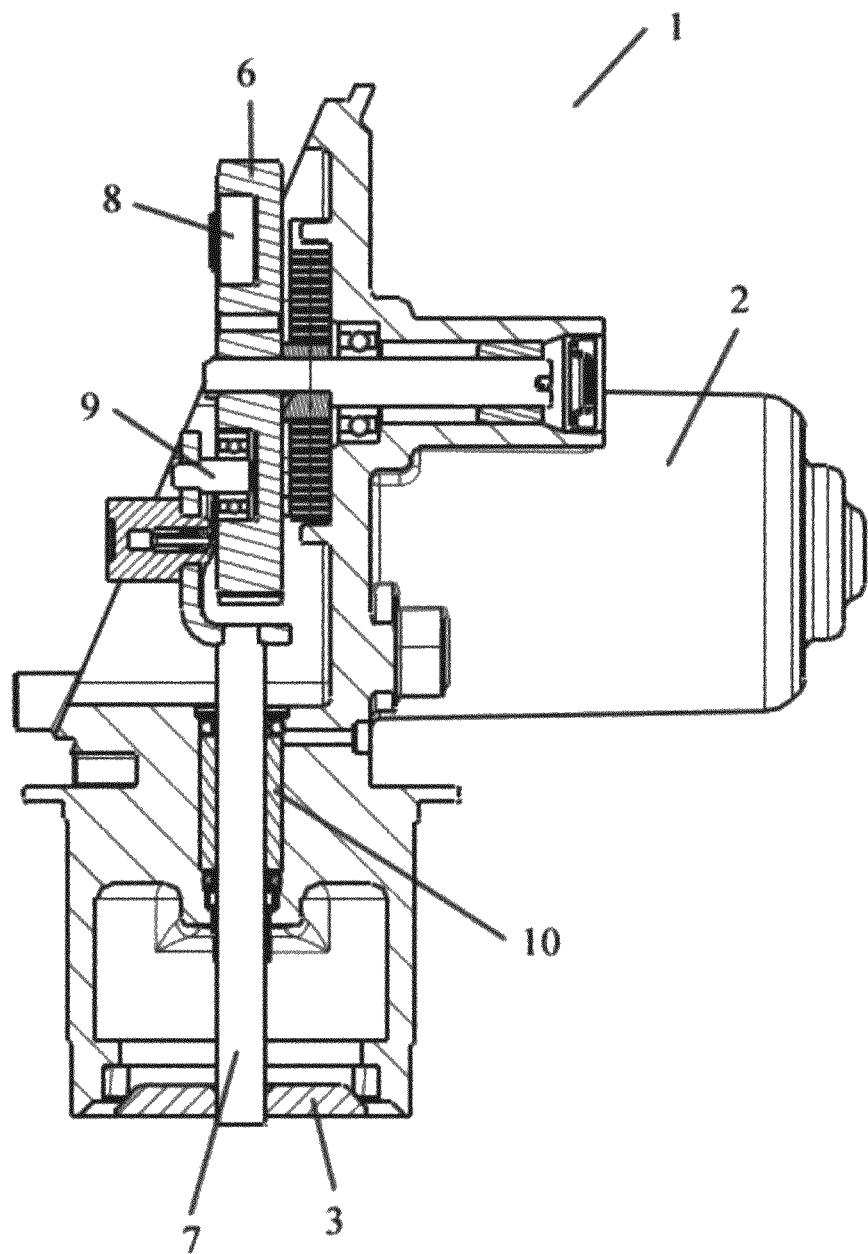
FIG. 3 shows a sectional view of the preferred embodiment of the linear drive device according to the present invention.

A preferred embodiment of a linear drive device according to the present invention is shown in FIGS. 1-3. In the embodiment, the linear drive device 1 comprises a motor 2, a first transmission stage (speed-reducing transmission stage) and a second transmission stage (linear transmission stage). The linear drive device causes a linear movement of an output connecting rod 7 by the driving of the motor 2. In order to prevent dust or other rt and a linear movement part generally has a complex structure ice, a housing 11 and a corresponding sealing system are provided.

The first transmission stage, namely the speed-reducing transmission stage comprises a pinion gear 5 fixedly connected to an output shaft of the motor and a transmission gear 6 meshing with the pinion gear 5. When the motor 2 operates, the pinion gear 5 is driven to rotate, so that the transmission gear 6 meshing with the pinion gear 5 is rotated.

The second transmission stage is a linear transmission stage for transforming the rotational movement of the transmission gear 6 into the linear movement of the output connecting rod 7. The second transmission stage comprises a spiral trench 8 formed on the transmission gear 6, a follower 9 received in the trench 8 and the output connecting rod 7 fixedly connected to the follower 9.

The spiral trench 8 is, for example, of an involute shape. The center of the spiral trench 8 coincides with the center of the transmission gear 6. Since the arc length by which the spiral trench 8 rotates in one stroke of the linear transmission stage may be very large, the pressure angle between the trench 8 and the linear transmission stage is reduced. In the case that the transmitted force required has a given component in the direction of the linear movement, the reduction in the pressure angle results in an increase in the cosine value thereof, and thus a reduction in the transmission force between the trench 8 and the linear transmission stage. Therefore, the spiral trench 8 extends through an angle of 90 degrees to 320 degrees, preferably 90 degrees to 300 degrees, and more preferably 180 degrees to 300 degrees, in a circumferential direction of the transmission gear 6.

Figure 4:
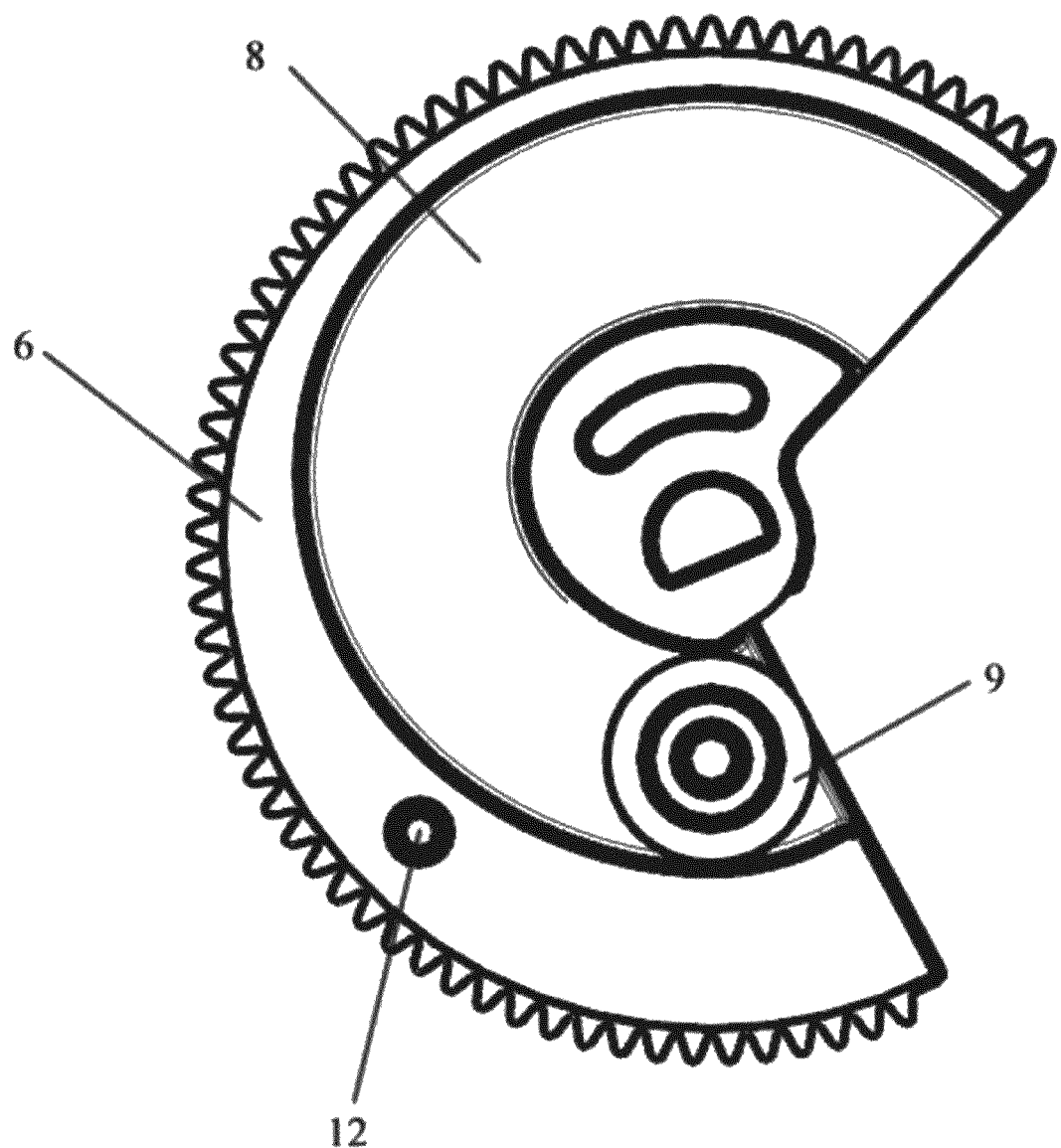
FIG. 4 shows a front view of a transmission gear according to an embodiment of the present invention as well as a follower received in a trench thereof.

The follower 9 may comprise a roller or a rolling bearing or a sliding bearing. Preferably, the follower 9 comprises a ball bearing as shown in FIG. 4. By using the ball bearing, the friction loss is reduced and the efficiency is improved. In the embodiment shown in FIG. 5, the follower 9 comprises a ball bearing 91 and a pin shaft 92 (see FIG. 7), wherein the ball bearing 91 bears in the trench 8 of the transmission gear 6 and is able to roll along the trench, and one end of the pin shaft 92 is connected to an inner ring of the ball bearing 91 and the other end is supported in a connector 17.

Figure 5:
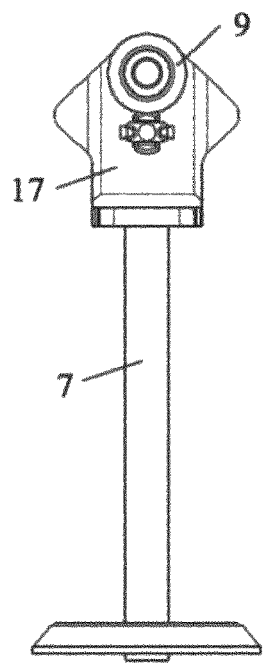
FIG. 5 shows a front view of an output assembly comprising an output connecting rod and the follower.
Figure 6:
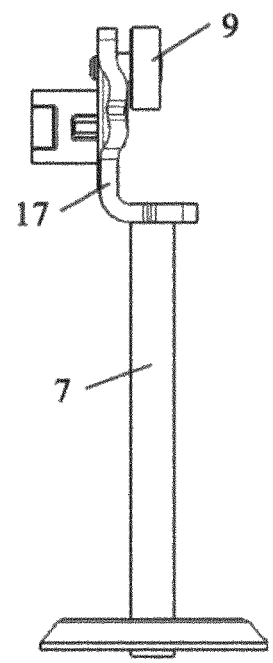
FIG. 6 shows a side view of the output assembly comprising the output connecting rod and the follower.
Figure 7:
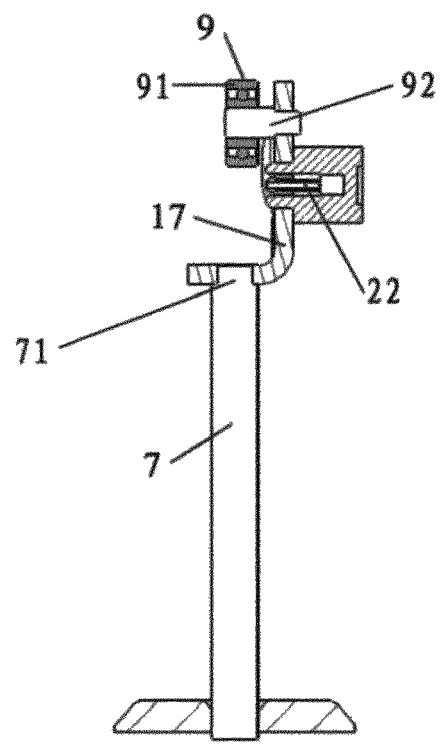
FIG. 7 shows a sectional view of the output assembly comprising the output connecting rod and the follower.
Figure 8:
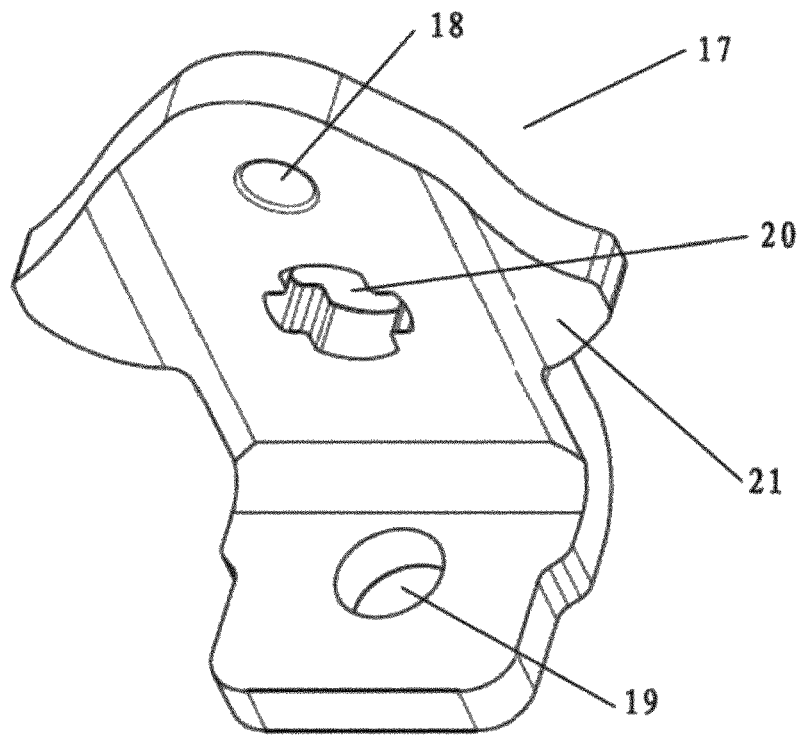
FIG. 8 shows a perspective view of a connector.
Figure 9:
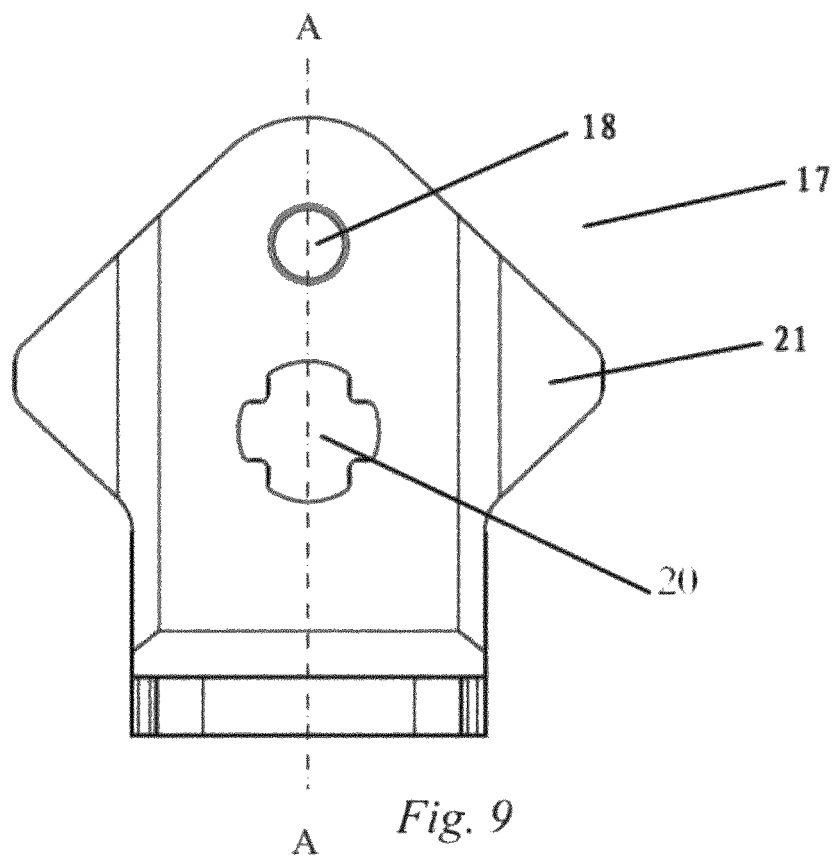
FIG. 9 shows a front view of the connector.
Figure 10:
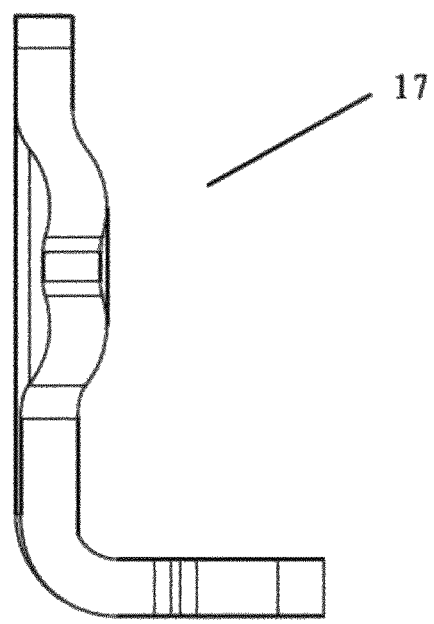
FIG. 10 shows a side view of the connector.
Figure 11:
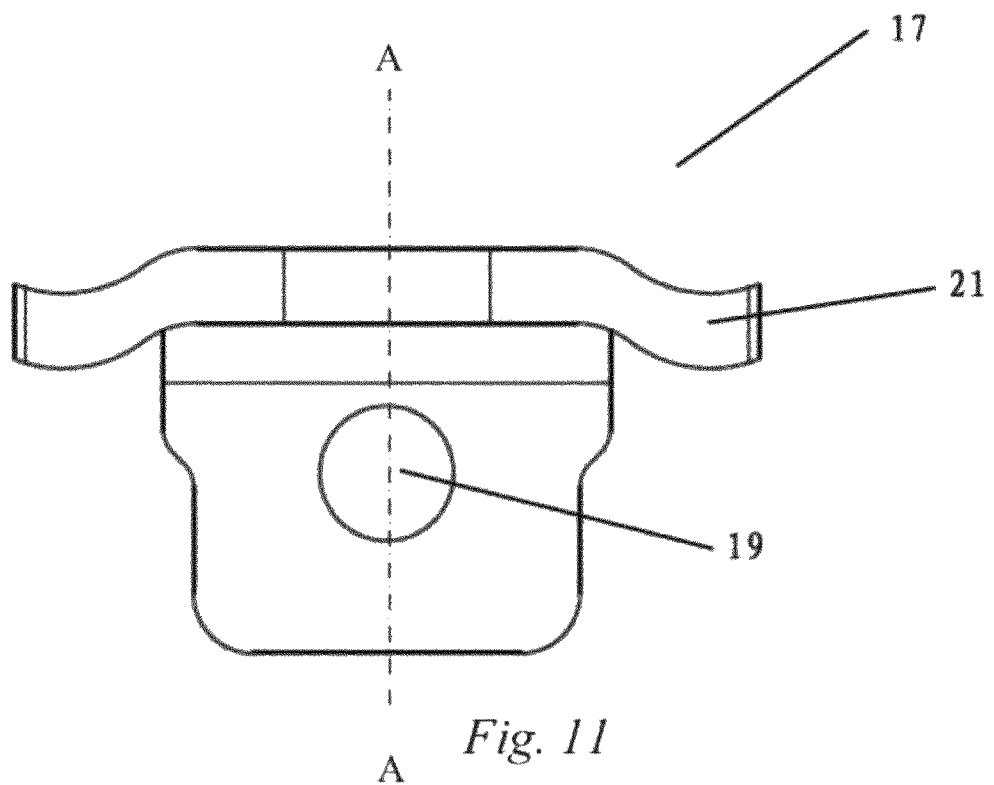
FIG. 11 shows a top view of the connector.
Figure 12:
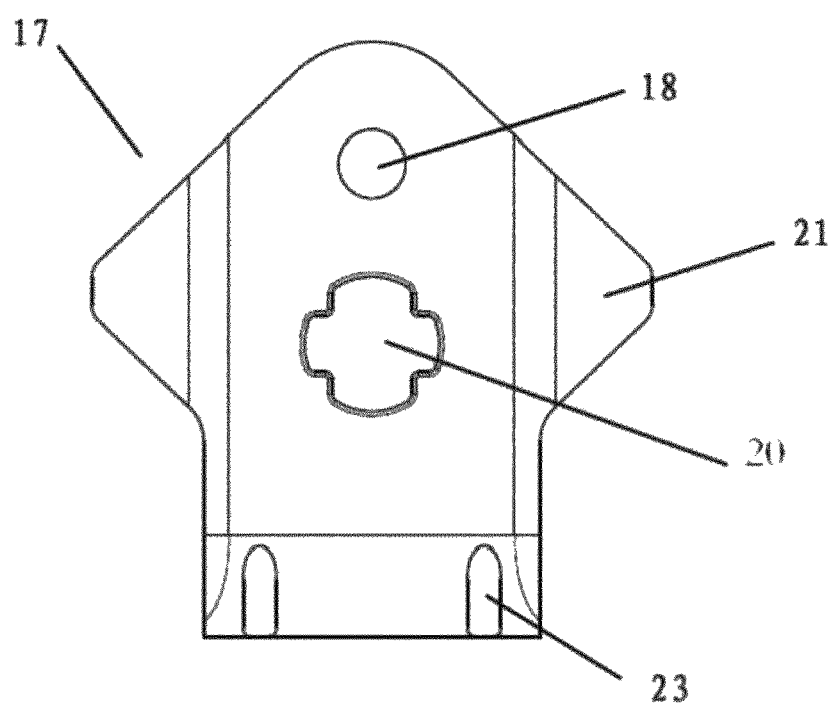
FIG. 12 shows a rear view of the connector.
Figure 13:
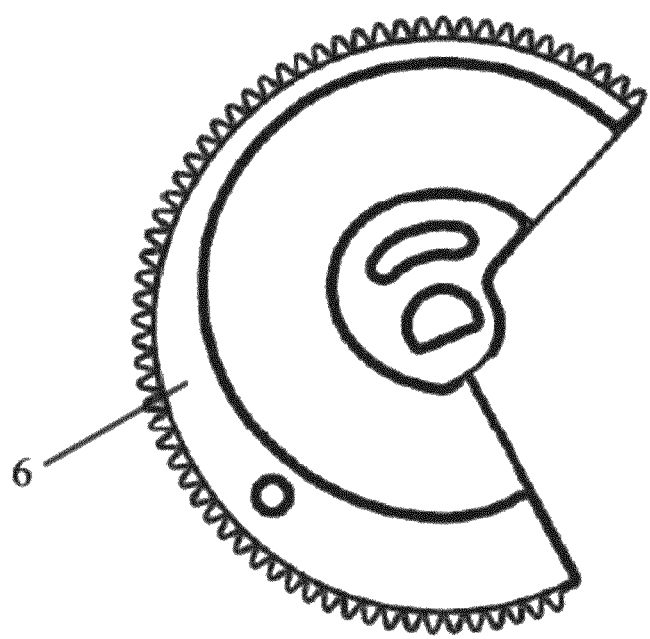
FIG. 13 shows a front view of a sector gear.

FIGS. 5-7 show an output assembly comprising the follower 9 and the output connecting rod 7, wherein the output connecting rod is connected to the pin shaft 92 of the follower 9 via the connector 17.

The connector 17 for connecting the follower 9 with the output connecting rod 7 will be explained below with reference to FIGS. 8-12. The connector 17 is configured as a right-angle member, and is provided in a vertical face thereof with a first hole 18 for connecting the follower 9. In particular, the pin shaft 92 of the follower 9 is received in the first hole 18. A second hole 19 for connecting a connecting rod journal 71 of the output connecting rod 7 is provided in a horizontal face. Furthermore, a third hole 20 for receiving a sensor pointer 22 of a position sensor is further provided in the vertical face. The sensor pointer 22 is used for transferring information on the position of the connector to the sensor. The center axes of the first hole 18, the second hole 19 and the third hole 20 are all located in a center plane A of the connector 17 (see FIGS. 9 and 11). The center plane bisects the connector 17 in a vertical direction. In other words, the connector 17 is generally in mirror symmetry to the center plane.

During assembling, the pin shaft 91 of the follower 9 is pre-installed in the first hole 18 in a tight fit, and then the two are welded in order to ensure the connection strength; a riveting method or the like can also be used to achieve the connection. This is also the case of the connection of the output connecting rod 7 and the connector 17, wherein firstly the connecting rod journal 71 is pre-installed in the second hole 19 in a tight fit, and then welding is carried out in order to ensure the connection strength; a riveting method and the like can also be used to achieve the connection. The sensor pointer 22 is in snap fit with the connector, and a hot riveting method and the like can also be used.

Finally, an arcuate wing portion 21 is provided in the vertical face. The arcuate wing portion 21 protrudes towards one side of the transmission gear 6, and is close to the transmission gear 6 as much as possible but not in contact therewith, so as to prevent the generation of scraping, which would otherwise damage the gear. When the connector 17 swings, one side of the arcuate wing portion 21 comes into contact with the transmission gear 6, thereby preventing a substantial swinging of the connector which would otherwise influence the sensor signal.

Two inwardly concave reinforcement ribs 23 (see FIG. 12) are provided at a corner where the vertical face and the horizontal face of the connector 17 meet each other. The reinforcement ribs increase the bending strength of the part as a whole. The reinforcement ribs are formed by stamping, and intersect the two right-angle faces at an angle of 30 degrees to 60 degrees, particularly 45 degrees.

This connector is small in volume, is easy to machine and achieves a variety of functions: connecting and transmitting moment of force, connecting the sensor pointer and preventing a substantial rotation.

The output connecting rod 7 is provided in a sleeve member 10, and thus it can only linearly move up and down (see FIG. 3). When the transmission gear 6 rotates, the follower 9 is displaced along the trench 8, and due to the spiral shape of the trench 8, the follower 9 is moved up and down, so that the output connecting rod 7 is driven to move up and down.

In one embodiment, as shown in FIG. 6, the transmission gear 6 is a sector gear. Since an unused portion is eliminated, material is saved and assembly is facilitated.

In one embodiment, a form-fitting structure exists between the transmission gear 6 and the housing 11 for enclosing the linear drive device. In the illustrated embodiment, a pin 12 is fixed to the transmission gear 6 (see FIG. 4), and the pin, when mating with a feature on the housing 11, can be used as a mechanical stop to prevent the follower 9 from falling out of the trench 8 of the transmission gear 6.

Preferably, the dimensions of the sectoral face of the sector gear are exactly adapted to the length of the spiral trench 8. That is to say, the entire sectoral face is used for the transmission.

Figure 14:
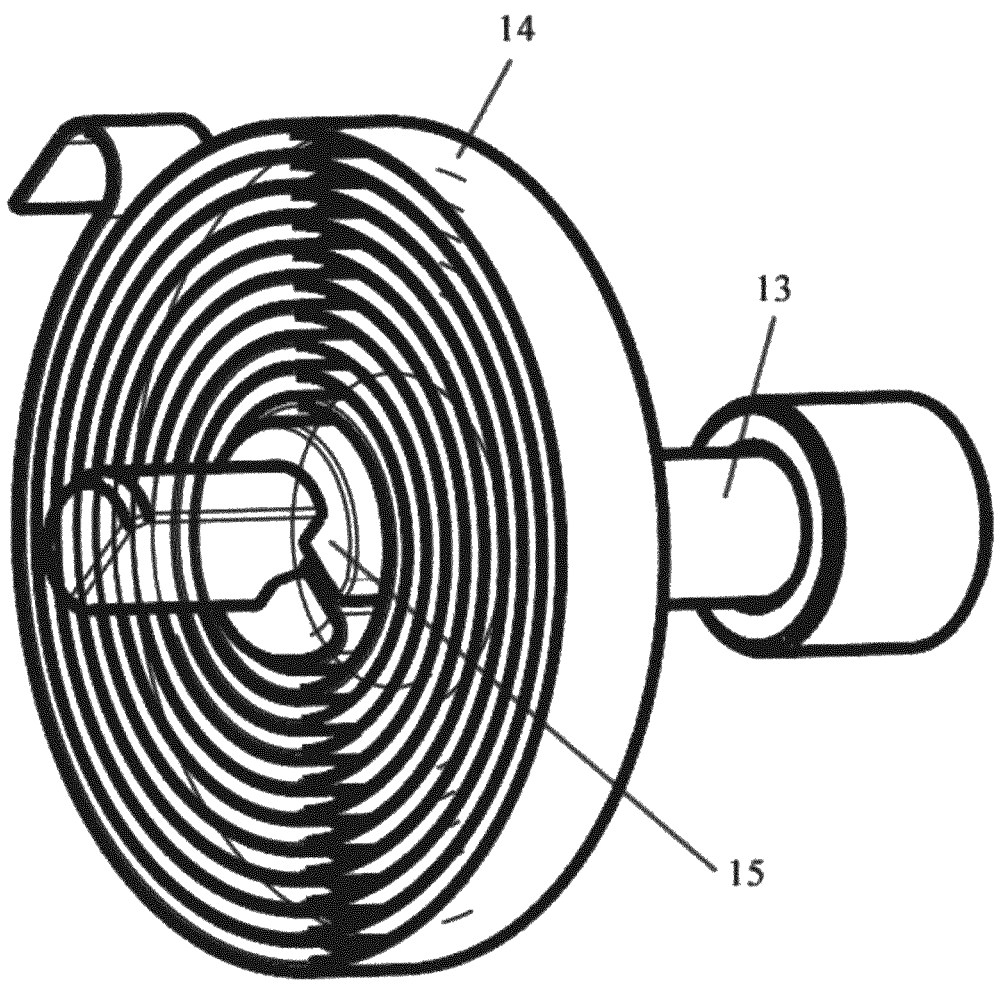
FIG. 14 shows a perspective view of a volute spring together with an axle.
Figure 15:
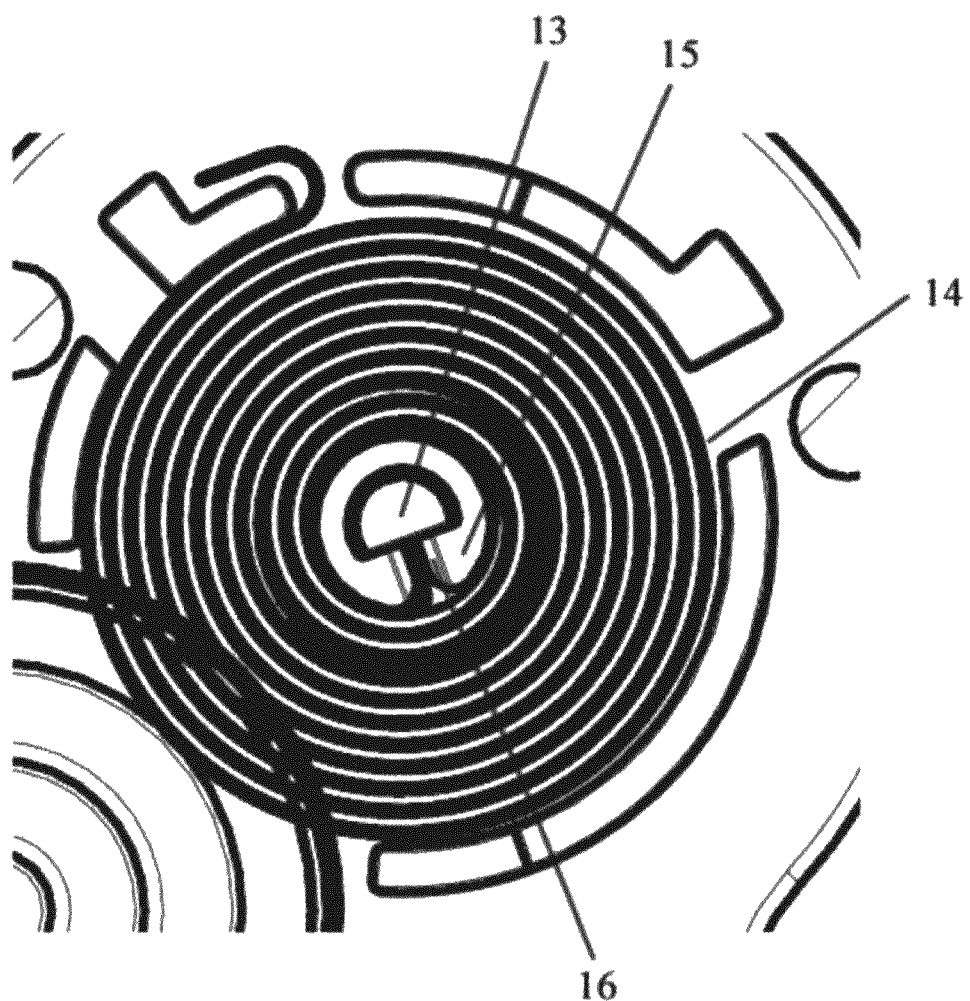
FIG. 15 shows a front view of the volute spring together with the axle.

In order to enable the output connecting rod 7 to return back to the initial position even if the motor 2 malfunctions or is de-energized, the linear transmission device preferably further comprises a restoring system for restoring without electricity as shown in FIGS. 14 and 15. It is well known that when the motor is energized, the driving thereof in two opposite directions can achieve the driving and the restoring. However, when the motor is de-energized (for example, due to a failure or for other reasons), it is desirable that the transmission device can also restore to the initial position, so that there is a need for such a restoring system.

The restoring system comprises an axle 13 for bearing the transmission gear 6 and a spring. The spring may be a torsion spring (such as a spiral torsion spring or a torsion bar spring). In addition, the spring may also be the volute spring 14 fixed to the axle 13 as shown in the figures. The axle 13 is mounted at two end portions thereof to the housing 11 via bearings. The axle 13 and the transmission gear 6 are connected in a relatively non-rotatable manner. One end of the volute spring 14 is fixed to the housing 11 of the device, and the other end is directly or indirectly fixed to the axle 13. After the assembling is completed, in the initial position of the transmission device, the volute spring 14 is in a pre-stressed state and applies a torque to the axle 13, so that the linear transmission stage trends to move upwards. Since the spring in the initial position is already in a pre-stressed state, when the valve is opened to the largest degree, the pre-stressing force of the spring is higher. By using the volute spring 14, the restoring force is increased and the fixing is facilitated, with a saving in space.

The fixing of the volute spring 14 to the axle 13 may be carried out using a spring bushing 15. The spring bushing 15 is fixed to the axle 13 in such a way that it surrounds the axle 13 and is provided with a groove 16, and an end portion of the volute spring 14 is received in the groove 16. With this approach, the fixing of the spring is more convenient, and the force is transferred to the axle 13 better.

The axle 13 may also be integrally formed with the spring bushing 15, such that the spring is directly connected to the axle 13. Of course, it is also contemplated that the groove 16 for receiving the end portion of the volute spring 14 is directly provided in the axle 13 to realize the function of connection.

Of course, other methods for fixing the spring are also contemplated, for example, by fixing one end of the spring to the housing and the other end to the transmission gear. In addition, as to the volute spring, the rotation may be along either an inner ring or an outer ring.

In one embodiment, the axle 13 at least partially has a non-circular cross section, for example a D-shaped cross section as shown in FIGS. 14 and 15, or may be of other shapes such as square and the like. As a result of the design, the relatively non-rotatable connection of the axle 13 and the transmission gear 6 can be easily achieved by providing a form-fitting through-hole in the transmission gear 6.

The linear drive device 1 may comprise a sensor (not shown) for detecting a position of the connecting rod, and the sensor may be, for example an inductive sensor, a Hall sensor, a magnetoresistive sensor or a contact sensor. These sensors can be arranged in different positions, and can detect different types of movements depending on the different types of sensors.

The linear drive device 1 can be used in a valve device, in particular an exhaust gas recirculation control valve in an engine exhaust gas recirculation system. The engine exhaust gas recirculation system is well known. In such an exhaust gas recirculation system, the exhaust gas recirculation control valve is used in an exhaust gas recirculation pipe to control the amount of the recirculated exhaust gas.

For applications in the exhaust gas recirculation valve or other valve devices, the output connecting rod 7 of the linear drive device is connected to a valve head 3, and drives the valve head 3 to move when the output connecting rod 7 moves, so as to change the distance of the valve head from a valve seat (not shown), thereby realizing an adjustment of the valve. The motor 2 of the linear drive device 1 of the exhaust gas recirculation control valve is controlled to drive the valve head 3 to move up and down by the output connecting rod 7 of the linear drive device, so that the valve is closed or opened. When the exhaust gas recirculation control valve is de-energized, due to the pre-stressing of the spring, a spring force is applied to the axle 13 and causes the axle 13 to rotate, thereby driving the rotation of the transmission gear 6, and the trench 8 on the transmission gear 6 drives the follower 9, thereby driving the connecting rod 7 to move upward until the valve is closed.

In addition, the current position of the output connecting rod 7 is detected by the sensor and is transmitted to a control device so as to control the exhaust gas recirculation control valve.

While the present invention has been disclosed above by the relatively preferred embodiments, the present invention is not limited thereto. A variety of changes and modifications made by a person skilled in the art, without departing from the spirit and scope of the present invention, should be included in the scope of protection of the present invention, and thus the scope of protection of the present invention is defined by the claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SIGNS 1 linear drive device
2 motor 3 valve head
5 pinion gear
6 transmission gear
7 output connecting rod
8 trench
9 follower
10 sleeve member
11 housing
12 pin
13 axle
14 volute spring
15 spring bushing
16 groove
17 connector
18 first hole
19 second hole
20 third hole
21 wing portion
22 sensor pointer
23 reinforcement rib
71 connection journal
91 ball bearing
92 pin shaft
A center plane

The invention claimed is:

1. A linear drive device (1), comprising:
   a motor (2);
   a speed-reducing transmission stage having:
      a pinion gear (5) fixedly connected to an output shaft of the motor (2), and
      a transmission gear (6) meshing with the pinion gear (5);
   a linear transmission stage configured to transform a rotational movement of the transmission gear (6) into a linear movement of an output connecting rod (7), the output connecting rod (7) being received in a sleeve member (10) so as to only move linearly;
   a spiral trench (8) arranged on the transmission gear (6); and
   a follower (9) received in the spiral trench (8) so as to be movable in the spiral trench (8), the follower (9) being connected to the output connecting rod (7) via q connector (17), the connector (17) having a vertical member having a central portion thereof, and a horizontal member, arranged at a right angle with respect to the central portion of the vertical member,
   wherein the central portion of the vertical member has a first vertical face arranged in a first plane proximate the transmission gear (6) and a second vertical face arranged in a second plane distal the transmission gear (6), the vertical member having an arcuate wing portion (21) arranged at an outer edge of the vertical member and protruding from the first plane in a horizontal direction towards the transmission gear (6), the arcuate wing portion (21) being arranged with respect to the transmission gear (6) so as to limit swinging of the connector (17) in relation to the transmission gear (6).

2. The linear drive device as claimed in claim 1, wherein the follower (9) comprises a bearing (91) having an inner ring, and a pin shaft (92) inserted into the inner ring of the bearing (91).

3. The linear drive device as claimed in claim 2, wherein a first hole (18) configured to connect the pin shaft (92) of the follower (9) is provided in the vertical member of the connector (17).

4. The linear drive device as claimed in claim 3, wherein:
   the output connection rod (7) has a connecting rod journal (71), and
   a second hole (19) configured to connect the connecting rod journal (71) of the output connecting rod (7) is provided in the horizontal member of the connector (17).

5. The linear drive device as claimed in claim 4, further comprising a position sensor having a sensor pointer (22), wherein a third hole (20) configured to connect the sensor pointer (22) of the position sensor is further provided in the vertical member of the connector (17).

6. The linear drive device as claimed in claim 5, wherein center axes of the first hole (18), the second hole (19) and the third hole (20) are all located in a center plane (A) of the connector (17).

7. The linear drive device as claimed in claim 1, the linear drive device further comprising two inwardly concave reinforcement ribs (23) arranged at a right-angle corner where the vertical member and the horizontal member of the connector (17) meet each other.

8. The linear drive device as claimed in claim 7, wherein the concave reinforcement ribs (23) are formed by stamping, and/or the concave reinforcement ribs (23) intersect the vertical member at an angle of 30 degrees to 60 degrees.

9. An exhaust gas recirculation control valve for an exhaust gas recirculation circuit of an engine, the exhaust gas recirculation control valve comprising a linear drive device (1) as claimed in claim 1.

* * * * *